(12) United States Patent
Roberts (10) Patent No.: US 10,186,933 B2
(45) Date of Patent: Jan. 22, 2019

(54) ELECTRIC MOTOR OR GENERATOR (71) Applicant: PROTEAN ELECTRIC LIMITED, Surrey (GB)

(72) Inventor: Gareth Roberts, South Heighton (GB)

(73) Assignee: PROTEAN ELECTRIC LIMITED (GB)

( * ) Notice: Subject to any disclaimer, the term of this patent is extended or adjusted under 35 U.S.C. 154(b) by 327 days.

(21) Appl. No.: 15/021,021

(22) PCT Filed: Sep. 10, 2014

(86) PCT No.: PCT/IB2014/064372
§ 371 (c)(1),
(2) Date: Mar. 10, 2016

(87) PCT Pub. No.: WO2015/036921
PCT Pub. Date: Mar. 19, 2015

(65) Prior Publication Data
US 2016/0226346 A1 Aug. 4, 2016

(30) Foreign Application Priority Data

Sep. 10, 2013 (GB) .................................. 1316091.6
Sep. 10, 2013 (GB) .................................. 1316098.1
May 23, 2014 (GB) .................................. 1409254.8

(51) Int. Cl.
*H02K 9/22* (2006.01)
*H02K 7/14* (2006.01)
(Continued)

(52) U.S. Cl.
CPC .............. *H02K 9/22* (2013.01); *B60L 3/0061* (2013.01); *B60L 11/005* (2013.01); *H02K 1/20* (2013.01);
(Continued)

(58) Field of Classification Search
CPC ....................................................... H02K 9/22
See application file for complete search history.

(56) References Cited

U.S. PATENT DOCUMENTS 5,977,679 A * 11/1999 Miller .................... H02K 1/165
310/164
7,402,924 B2 * 7/2008 Bibeau ..................... H02K 5/20
310/216.136
(Continued)

FOREIGN PATENT DOCUMENTS

CN 202218109 U 5/2012
DE 102006035696 A1 2/2008
(Continued)

OTHER PUBLICATIONS

European Patent Office, Initial Publication without ISR, Mar. 2015, WIPO, Rijswijk.
(Continued)

*Primary Examiner* — Robert W Horn
(74) *Attorney, Agent, or Firm* — Valerie M. Davis; The Mason Group Patent Specialists (57) ABSTRACT

An electric motor or generator comprising a stator having stator teeth for mounting electrical coils, a rotor, a first electrical device arranged to control current in the electric coils to generate a rotational torque on the rotor and a second electrical device arranged to modify current provided to the first electrical device, wherein the stator includes a cooling arrangement having a cooling channel arranged to cool the electrical coils, the first electrical device and the second electrical device.

10 Claims, 6 Drawing Sheets

(51) Int. Cl.
  *H02K 9/19* (2006.01)
  *H02K 11/33* (2016.01)
  *H02K 7/18* (2006.01)
  *H02K 1/20* (2006.01)
  *H02K 9/00* (2006.01)
  *B60L 3/00* (2006.01)
  *B60L 11/00* (2006.01)
  *H02K 21/22* (2006.01)
  *H02K 5/20* (2006.01)

(52) U.S. Cl.
  CPC .............. *H02K 7/14* (2013.01); *H02K 7/1846* (2013.01); *H02K 9/005* (2013.01); *H02K 9/19* (2013.01); *H02K 11/33* (2016.01); *B60L 2220/14* (2013.01); *B60L 2220/16* (2013.01); *B60L 2220/44* (2013.01); *B60L 2220/50* (2013.01); *H02K 5/20* (2013.01); *H02K 21/22* (2013.01)

(56) References Cited

U.S. PATENT DOCUMENTS

| | | | | |
|---|---|---|---|---|
| 7,977,832 B2* | 7/2011 | Vadillo | .................. | H02K 9/14 310/58 |
| 2011/0169352 A1* | 7/2011 | Nagao | .................. | H02K 5/20 310/59 |
| 2012/0098366 A1 | 4/2012 | Yamasaki et al. | | |
| 2013/0049495 A1* | 2/2013 | Matsuo | .................. | H02K 5/20 310/53 |
| 2013/0162071 A1* | 6/2013 | Chamberlin | .............. | H02K 9/22 310/64 |
| 2014/0009013 A1* | 1/2014 | Chamberlin | .............. | H02K 9/19 310/54 |
| 2015/0228411 A1* | 8/2015 | Owen | .................. | H01G 4/38 310/68 R |
| 2016/0226346 A1* | 8/2016 | Roberts | .................. | H02K 7/14 |
| 2017/0324307 A1* | 11/2017 | Roberts | .................. | H02K 11/25 |

FOREIGN PATENT DOCUMENTS

| | | |
|---|---|---|
| DE | 102011118578 A1 | 5/2013 |
| DE | 102011118579 A1 | 5/2013 |
| EP | 2001107 A2 | 12/2008 |
| EP | 2346146 A1 | 7/2011 |
| GB | 2295730 A | 6/1996 |
| GB | 2394367 A | 4/2004 |
| GB | 2504222 A | 1/2014 |
| JP | 2003199363 A | 7/2003 |
| JP | 2003318062 A | 11/2003 |
| JP | 2004088983 A | 3/2004 |

OTHER PUBLICATIONS

European Patent Office, International Search Report, dated Jun. 2, 2015, WIPO, Rijswijk.
European Patent Office, Written Opinion of the International Search Authority, dated Jun. 2, 2015, WIPO, Rijswijk.
Intellectual Property Office, Exam Report, dated Jun. 27, 2014, IPO, South Wales.
Intellectual Property Office, Exam Report—Search and Exam, dated Oct. 4, 2013, IPO, South Wales.
Intellectual Property Office, Exam Report—Standard, dated Oct. 8, 2014, IPO, South Wales.
Intellectual Property Office, Search Report—First, dated Oct. 4, 2013, IPO, South Wales.
Intellectual Property Office, Search Report—First, dated Oct. 24, 2013, IPO, South Wales.
Intellectual Property Office, Search Report—First, dated Jun. 27, 2014, IPO, South Wales.

* cited by examiner

ELECTRIC MOTOR OR GENERATOR

The present invention relates to an electric motor or generator, in particular an electric motor or generator having a cooling channel.

With increased interest being placed in environmentally friendly vehicles there has been a corresponding increase in interest in the use of electric motors for providing drive torque for electric vehicles.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

In the commercial arena three phase electric motors are the most common kind of electric motor available.

A three phase electric motor typically includes three coil sets, where each coil set is arranged to generate a magnetic field associated with one of the three phases of an alternating voltage.

To increase the number of magnetic poles formed within an electric motor, each coil set will typically have a number of coil sub-sets that are distributed around the periphery of the electric motor, which are driven to produce a rotating magnetic field.

The three coil sets of a three phase electric motor are typically configured in either a delta or wye configuration.

A control unit for a three phase electric motor having a DC power supply will typically include a three phase bridge inverter that generates a three phase voltage supply for driving the electric motor. Each of the respective voltage phases is applied to a respective coil set of the electric motor.

Typically, the three phase bridge inverter will generate a three phase voltage supply using a form of pulse width modulation (PWM) voltage control. PWM control works by using the motor inductance to average out an applied pulse voltage to drive the required current into the motor coils. Using PWM control an applied voltage is switched across the motor coils. During this on period, the current rises in the motor coils at a rate dictated by its inductance and the applied voltage. The PWM control is then required to switch off before the current has changed too much so that precise control of the current is achieved.

A three phase bridge inverter includes a number of switching devices, for example power electronic switches such as Insulated Gate Bipolar Transistor (IGBT) switches.

In the context of an electric vehicle motor, a drive design that is becoming increasing popular is an integrated in-wheel electric motor design in which an electric motor and its associated control system are integrated within a wheel of a vehicle.

However, the integration of an electric motor, and its associated control system, within a wheel of a vehicle can impose increased thermal management considerations upon the electric motor, which can result in a reduction in efficiency and power generating capabilities of an electric motor.

In accordance with an aspect of the present invention there is provided an electric motor or generator according to the accompanying claims.

The invention as claimed provides the advantage of allowing a single cooling channel to be used to provide cooling to a plurality of components within an electric motor, where the single channel can be configured to provide optimised cooling based upon the cooling requirements of the different components.

The present invention will now be described, by way of example, with reference to the accompanying drawings, in which.

Figure 1:
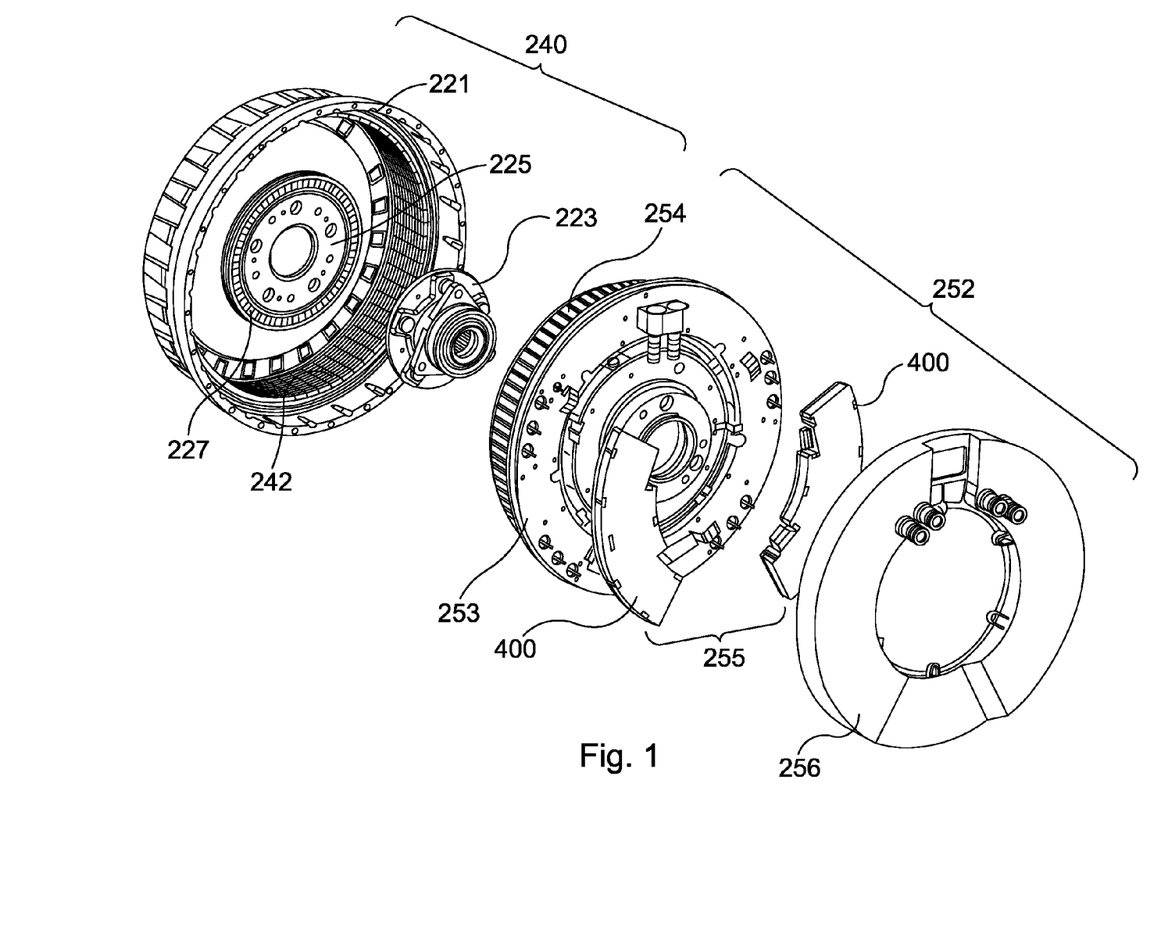
FIG. 1 illustrates an exploded view of a motor embodying the present invention.
Figure 2:
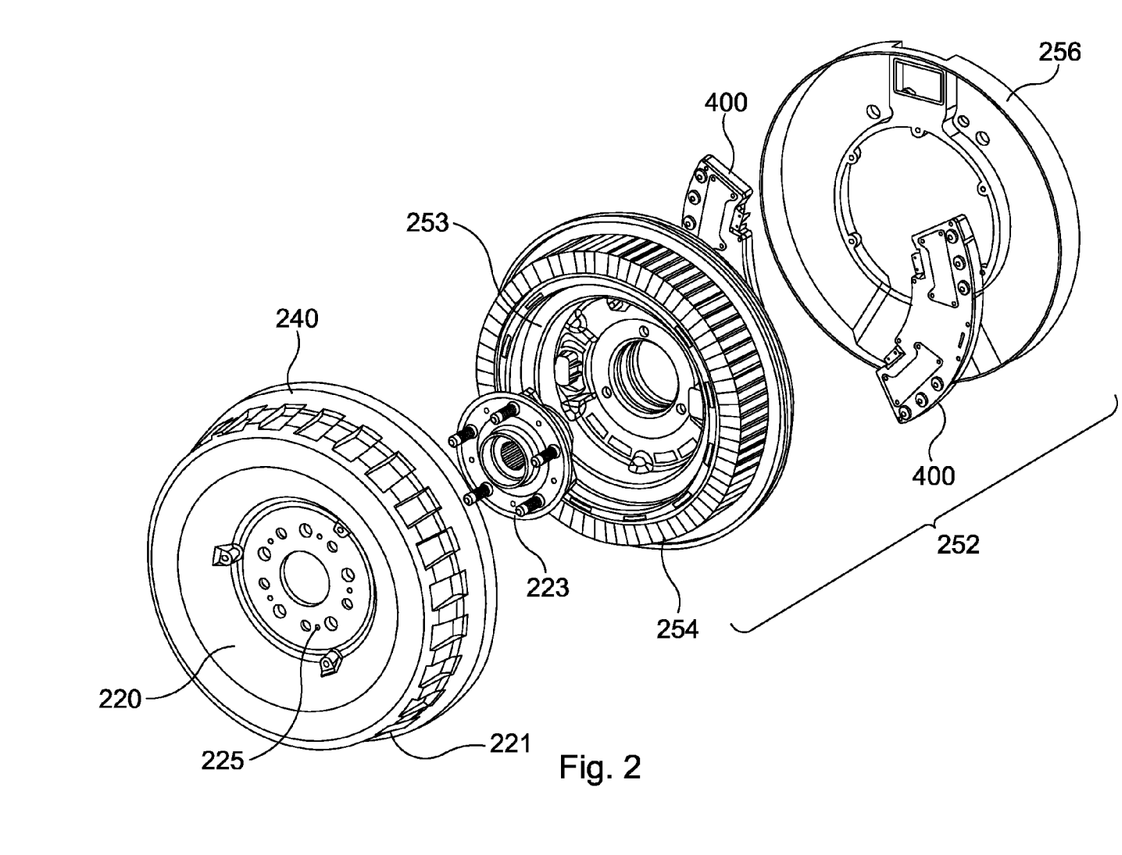
FIG. 2 is an exploded view of the motor of FIG. 1 from an alternative angle.

FIG. 1 and FIG. 2 illustrate an electric motor assembly incorporating an electric motor having a cooling arrangement according to the present invention where the electric motor assembly includes built in electronics and is configured for use as a hub motor or in-wheel electric motor built to be accommodated within a wheel. However, the present invention could be incorporated in any form of electric motor. The electric motor can also be configured as a generator.

For the purposes of the present embodiment, as illustrated in FIG. 1 and FIG. 2, the in-wheel electric motor includes a stator assembly 252 and a rotor assembly 240. The stator assembly 252 comprising a heat sink 253 having a cooling channel, multiple coils 254, an electronics module 255 mounted in a rear portion of the stator for driving the coils, and a capacitor (not shown) mounted on the stator within a recess 257 formed on the rear portion of the stator. In a preferred embodiment the capacitor is an annular capacitor element.

The coils 254 are formed on stator tooth laminations to form coil windings. A stator cover 256 is mounted on the rear portion of the stator 252, enclosing the electronics module 255 to form the stator assembly 252, which may then be fixed to a vehicle and does not rotate relative to the vehicle during use.

The electronics module 255 includes two control devices 400, where each control device 400 includes an inverter and control logic, which in the present embodiment includes a processor, for controlling the operation of the inverter.

To reduce the effects of inductance on the inverters, housed in the electronics module 255, when switching current, the capacitors mounted on the stator is used as a local voltage source for the electric motor inverters. By placing a capacitor close to an inverter the inductance associated with the voltage source is minimised.

A rotor 240 comprises a front portion 220 and a cylindrical portion 221 forming a cover, which substantially surrounds the stator assembly 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor assembly 240 to cause the rotor assembly 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 2 shows an exploded view of the same assembly as FIG. 1 from the opposite side showing the stator assembly 252 and rotor assembly 240. The rotor assembly 240 comprises the outer rotor wall 220 and circumferential wall 221 within which magnets 242 are circumferentially arranged. As previously described, the stator assembly 252 is connected to the rotor assembly 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor includes an associated second sensor placed 90 electrical degrees displaced from the first sensor.

The motor in this embodiment includes two coil sets with each coil set having three coil sub-sets that are coupled in a wye configuration to form a three phase sub-motor, resulting in the motor having two three phase sub-motors. However, although the present embodiment describes an electric motor having two coil sets (i.e. two sub motors) the motor may equally have three or more coil sets with associated control devices (i.e. three or more sub motors). For example in a preferred embodiment the motor includes eight coil sets with each coil set 60 having three coil sub-sets that are coupled in a wye configuration to form a three phase sub-motor, resulting in the motor having eight three phase sub-motors.

Figure 3:
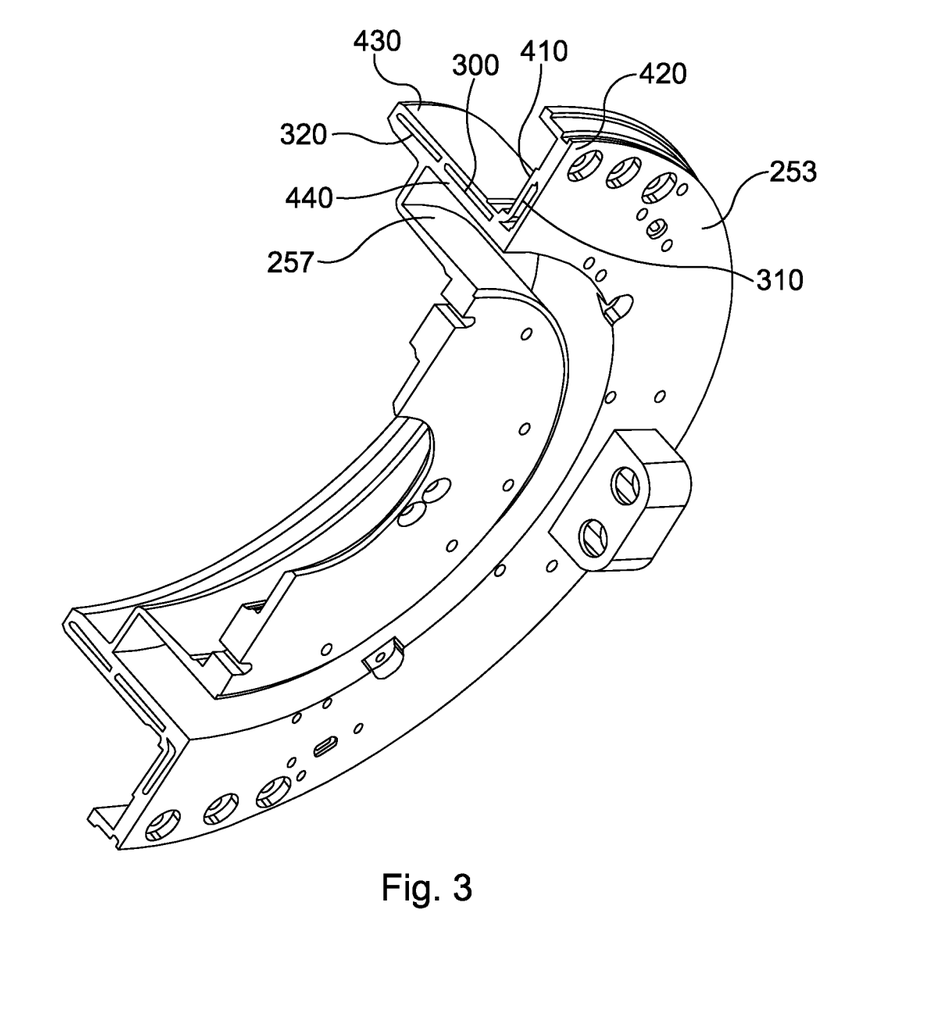
FIG. 3 illustrates a cross sectional view of a stator according to an embodiment of the present invention.

FIG. 3 illustrates a cross sectional view of the stator heat sink 253, where a cooling channel 300 is formed in a circumferential portion of the stator heat sink 253. Coolant is arranged to flow around the cooling channel 300, as described below.

The cooling channel 300 is arranged to have a first portion 310 that is orientated to be substantially perpendicular to a second portion 320 of the cooling channel 300. The first portion 310 and second portion 320 form a single cooling channel 300, where coolant is arranged to flow through the first portion 310 and the second portion 320. Additionally, the first portion 310 and second portion 320 are coupled to allow coolant to flow between the first portion 310 and second portion 320.

Figure 4:
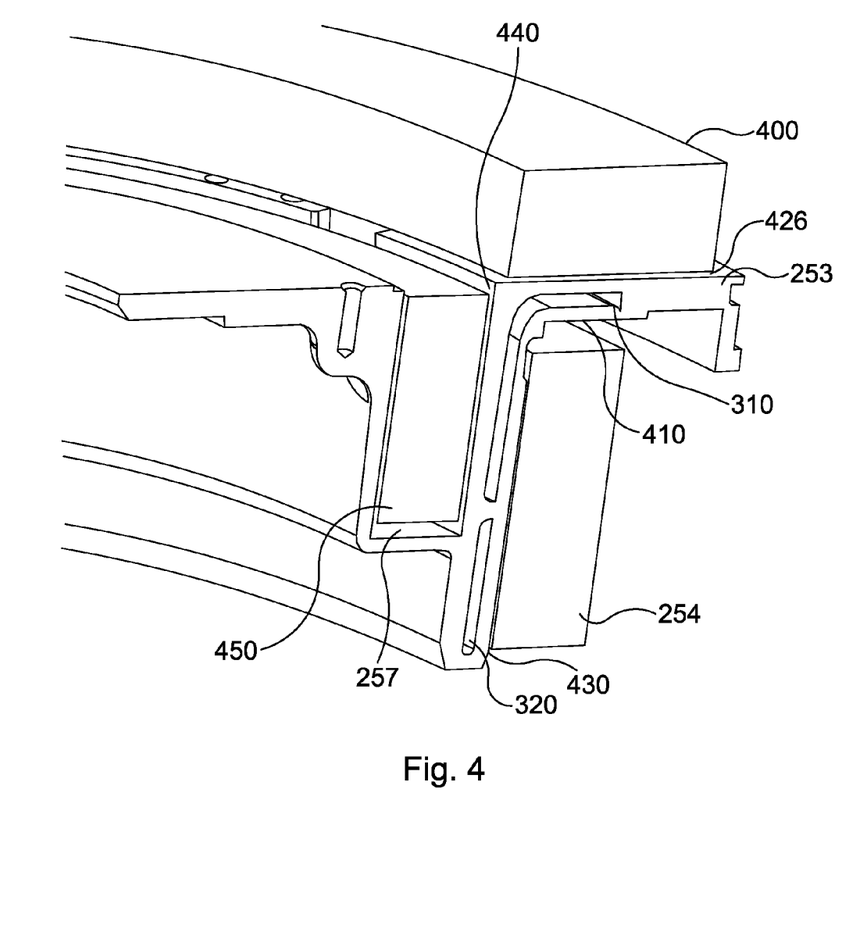
FIG. 4 illustrates a cross sectional view of a stator according to an embodiment of the present invention.

As illustrated in FIG. 4, one side of the first portion 310 of the cooling channel 300 is arranged to extend adjacent to a first surface 410 of the stator heat sink 253.

A second side of the first portion 310 of the cooling channel 300 is arranged to extend adjacent to a second surface 420 of the stator heat sink 253 upon which the control devices 400 are arranged to be mounted, as illustrated in FIG. 4.

Additionally, one side of the second portion 320 of the cooling channel 300 is arranged to extend adjacent to a third surface 430 of the stator heat sink 253. The stator teeth and coil windings 254 are arranged to be mounted on the third surface 430, as illustrated in FIG. 4.

A second side of the second portion 320 of the cooling channel 300 is arranged to extend adjacent to a fourth surface 440 of the stator heat sink 253, where the fourth surface 440 forms one side of the recess 257 for housing the capacitor 450, as illustrated in FIG. 4.

Accordingly, the present invention provides a cooling arrangement having a cooling channel arranged to cool the electrical coils 254, a first electrical device (i.e. the control devices 400) and a second electrical device (i.e. the capacitor 450).

Figure 5:
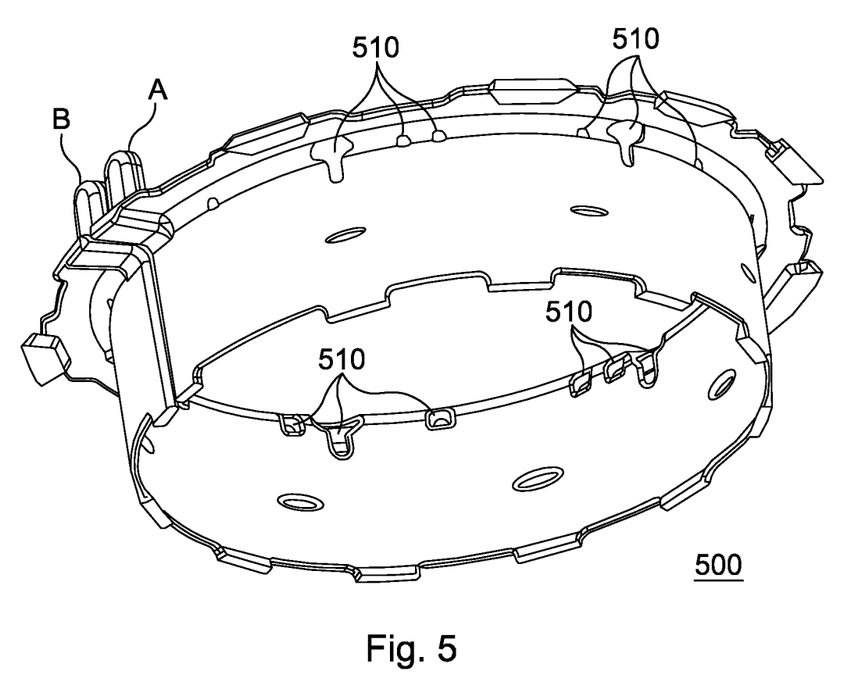
FIG. 5 illustrates a cooling channel moulding according to a first embodiment of present invention.

To illustrate a preferred configuration for the cooling channel 300, FIG. 5 represents a preferred embodiment of a cooling channel moulding 500 used to form a cooling channel 300 within a stator heat sink 253. Preferably, the stator heat sink 257 is formed using a sand casting process, where the cooling channel moulding 300 is formed from sand. However, any suitable form of process may be used.

As would be appreciated by a person skilled in the art, the solid sections of the cooling channel moulding 500 correspond to the sections of the cooling channel within which coolant is able to flow within the stator heat sink 253.

Correspondingly, the gaps formed within the cooling channel moulding 500 correspond to solid sections within the cooling channel 300 in which coolant is unable to flow.

Feature A on the cooling channel moulding 500 corresponds to the cooling channel inlet, where cooling fluid is input into the cooling channel. Within the stator heat sink 253, the coolant travels around the orthogonal oriented sections of the cooling channel 300, which corresponds to the first portion 310 and second portion 320 of the cooling channel 300, in a clockwise direction based on the orientation of the cooling channel moulding illustrated in FIG. 5.

Feature B on the cooling channel moulding 500 corresponds to the cooling channel outlet, where cooling fluid is output from the cooling channel 300.

The dimensions of the inlet section of the cooling channel 300 are preferably configured to determine the amount of cooling fluid that is directed to circulate in the respective first portion 310 and second portion 320 of the cooling channel 300. For example, protrusions within the cooling channel inlet may be used to set the required percentage of cooling fluid to be circulated within the respective first portion 310 and second portion 320 of the cooling channel 300. By way of illustration, if a greater amount of cooling is required in the second portion of the cooling channel, that is to say the cooling channel portion sandwiched between the capacitor 450 and the bottom of the stator teeth, protrusions within the cooling channel inlet can be used to send the majority of the coolant along this portion of the cooling channel 300.

The amount of coolant that flows between the first portion 310 and the second portion 320 of the coolant channel 300 is minimised by including a number of protrusions 510 at the interface between the first portion 310 and the second portion 320 of the cooling channel 300, as illustrated in FIG. 5. The protrusions 510 act as an obstacle to the coolant flow between the first portion 310 and second portion 320 of the coolant channel 300 and accordingly inhibit the movement of coolant fluid between the two portions 310, 320, thereby allowing a single coolant channel to be used but where the amount of coolant in the separate portions 310, 320 can be independently controlled.

Figure 6:
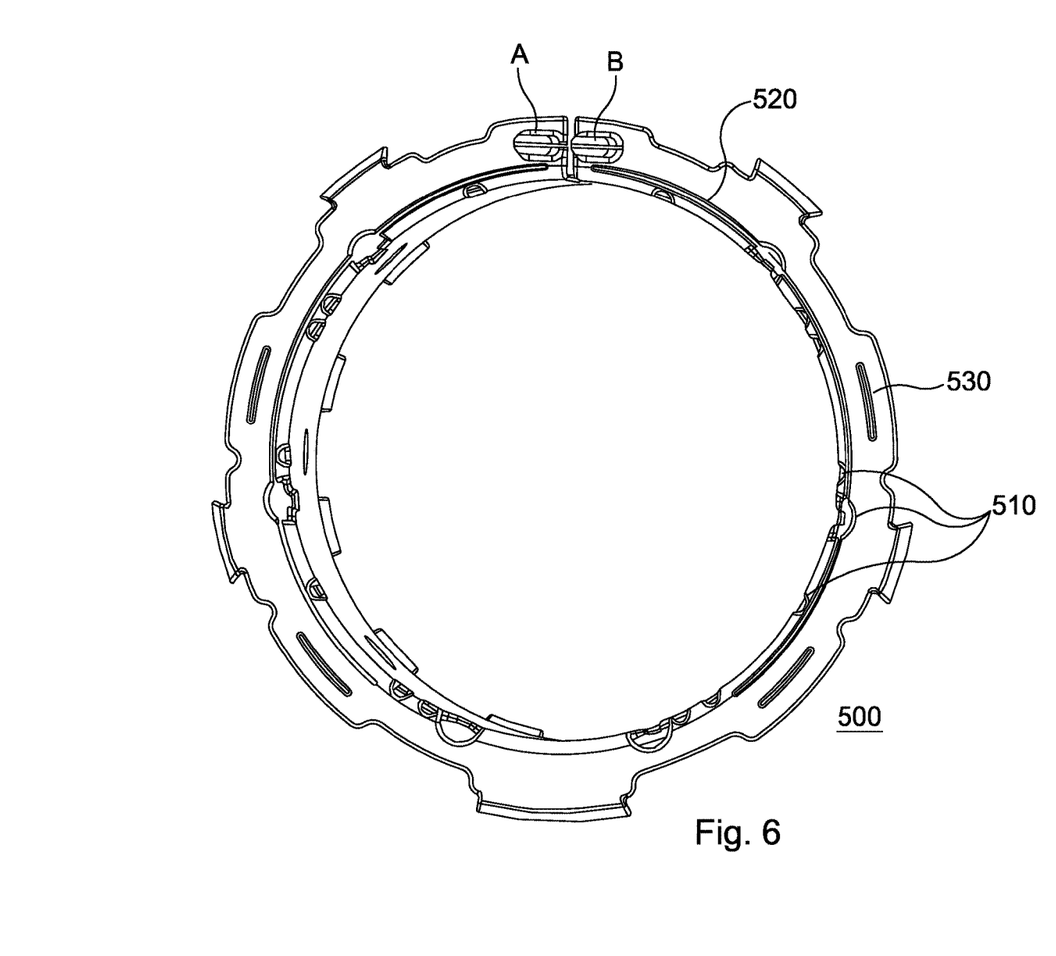
FIG. 6 illustrates a cooling channel moulding according to a second embodiment of present invention.

Preferably the effectiveness of the protrusions 510 may be enhanced by extending them to form a rib 520, as illustrated in FIG. 6, to cover more substantial portions of the cooling channel.

As the flow of coolant in the first portion 310 and the second portion 320 of the coolant channel 300 are effectively independent the cross sectional areas of the first portion 310 and second portion 320 of the cooling channel 300 can be independently selected depending upon the cooling needs associated with the different cooling channel portions. For example, if increased cooling is required the cross sectional area can be reduced to increase fluid flow. However, preferably for the present embodiment fluid flow is kept below five meters per second to minimise the risk of erosion of the stator heat sink 253.

To further fine tune the cooling characteristics of the first portion 310 and second portion 320 of the cooling channel 300 the cross sectional areas of different sections within the first portion 310 and/or second portion 320 can be changed depending upon specific cooling requirements. For example, as each of the two control device 400 mounted on the stator heat sink 253 only extend around a quarter of the stator heat sink circumference, to enhance cooling over the sections of the stator heat sink 253 upon which are mounted the control devices 400, the cross sectional area of the first portion 310 of the cooling channel 300 at these locations can be reduced relative to the sections of the first portion 310 at which the control devices 400 are not mounted, thereby increasing the cooling capability of the stator heat sink 253 at the positions where the control device 400 are mounted.

Accordingly, based on the cooling requirements it is possible to not only vary the amount of cooling between the first portion 310 and the second portion 320 of the cooling channel 300 but to also to vary the amount of cooling around both the first portion 310 and the second portion 320 of the cooling channel 300.

A further method of increasing the amount of cooling provided by the stator heat sink 253 is to increase the surface area of the first and/or second portion of the cooling channel. One method to provide increased surface area at targeted locations, for example under the control devices 400, would be to incorporated cooling ribs 530, as illustrated in FIG. 6.

Although the present embodiments, describe a single cooling channel having orthogonally oriented portions that are configured to provide optimum cooling to separate elements of the electric motor and associated control system, the electric motor may also include additional cooling channels for cooling other components, where the additional cooling channels may be of conventional design or as described above.

The invention claimed is:

1. An electric motor or generator comprising a stator having stator teeth for mounting electrical coils, a rotor, a first electrical device arranged to control current in the electric coils to generate a rotational torque on the rotor and a second electrical device arranged to modify current provided to the first electrical device, wherein the stator includes a cooling arrangement having a cooling channel arranged to cool the electrical coils, the first electrical device and the second electrical device, wherein the cooling channel is arranged to have a first portion that is orientated to be substantially perpendicular to a second portion of the cooling channel, wherein one side of the first portion of the cooling channel is arranged to extend alongside a first side of the electrical coils, a second side of the first portion of the cooling channel is arranged to extend alongside at least a portion of the first electrical device, one side of the second portion of the cooling channel is arranged to extend alongside a first side of the stator teeth, and a second side of the second portion of the cooling channel is arranged to extend alongside at least a portion of the second electrical device.

2. An electric motor or generator according to claim 1, wherein coolant fluid is arranged to flow through the first portion and the second portion of the cooling channel.

3. An electric motor or generator according to claim 2, wherein the cooling channel has at least one feature for directing coolant flow into the other portion of the cooling channel.

4. An electric motor or generator according to claim 1, wherein the cross sectional area of the first portion and second portion are selected based on the relative cooling requirements of the electrical coils, the first electrical device and the second electrical device.

5. An electric motor or generator according to claim 1, wherein the cooling channel is arranged to extend in a radial and/or circumferential direction around the stator.

6. An electric motor or generator according to claim 1, wherein the first electrical device is an IGBT or other power control device.

7. An electric motor or generator according to claim 1, wherein the second electrical device is a capacitor for filtering current flow to the first electrical device.

8. An electric motor or generator according to claim 1, wherein the cross sectional area of the first portion and/or second portion of the cooling channel varies at different locations around the stator to modify the amount of cooling provided by the cooling channel at the different locations around the stator.

9. An electric motor or generator according to claim 1, wherein a cooling rib is formed in the cooling channel for providing a cooling area in a localised area.

10. An electric motor or generator according to claim 1, wherein a cooling rib is formed in the cooling channel for providing a change in flow rate for providing localised cooling.

\* \* \* \* \*